US 6,434,602 B1

(12) United States Patent
Hazan et al.

(10) Patent No.: US 6,434,602 B1
(45) Date of Patent: Aug. 13, 2002

(54) METHOD, APPARATUS AND ARTICLE OF MANUFACTURE FOR ACCESSING ELECTRONIC MESSAGES

(75) Inventors: Sergio Roberto Hazan, Rio de Janeiro; Edgar Iria Melo, Rio de Janeiro; Ricardo Dias Campos, Porto Alegras, all of (BR)

(73) Assignee: Natyou Computer Communication Corporation, Orlando, FL (US)

( * ) Notice: Subject to any disclaimer, the term of this patent is extended or adjusted under 35 U.S.C. 154(b) by 0 days.

(21) Appl. No.: 09/406,343

(22) Filed: Sep. 27, 1999

(51) Int. Cl.[7] ............................................... G06F 15/16
(52) U.S. Cl. ....................................... 709/206; 709/219
(58) Field of Search ................................ 709/206, 207, 709/217, 219, 227

(56) References Cited

U.S. PATENT DOCUMENTS

| 5,872,930 A | * | 2/1999 | Masters et al. | 709/223 |
| 5,958,007 A | * | 9/1999 | Lee et al. | 709/219 |
| 5,968,117 A | * | 10/1999 | Schuetze | 709/206 |
| 5,987,508 A | * | 11/1999 | Agraharam et al. | 709/217 |
| 6,067,558 A | * | 5/2000 | Wendt et al. | 709/202 |
| 6,167,441 A | * | 12/2000 | Himmel | 709/217 |

FOREIGN PATENT DOCUMENTS

JP 11127190 A * 5/1999 ........... H04L/12/54

OTHER PUBLICATIONS

Bank, Microsoft to Unveil Post–PC Era Software—Company's Strategy Shifts to Extending Windows For Web Applications, Sep. 13, 1999, The Wall Street Journal, Eastern Edition, p. B3.*
Mosher, S., The Microsoft Exchange User's Handbook, Duke Press, 1997, pp. 176–187, 1997.*

* cited by examiner

Primary Examiner—Dung C. Dinh
Assistant Examiner—Bradley Edelman

(57) ABSTRACT

There is provided herein novel methods, apparatuses, and article of manufactures for accessing electronic mail ("e-mail") messages located on at least one e-mail server. For example, one exemplary embodiment of the present invention modifies an e-mail address with an e-mail syntax to connect to an e-mail server associated with said modified e-mail address thereby enabling access to e-mail messages associated with the e-mail server.

6 Claims, 4 Drawing Sheets

METHOD, APPARATUS AND ARTICLE OF MANUFACTURE FOR ACCESSING ELECTRONIC MESSAGES

BACKGROUND OF THE INVENTION

The invention relates to an improved method and apparatus for accessing an electronic mail system via the Internet to retrieve a user's electronic mail messages ("e-mail") and for restricting a computer user's access to a computer's hard drive.

Various well known electronic mail systems exist today. For example, an electronic mail system may be implemented on a peer-to-peer network, a client/server architecture, a mainframe computer, on a dial-up service, such as Compuserve, AOL, Microsoft MSN, etc. Various methods for retrieving e-mail stored in a user's e-mail account are also well known.

SUMMARY OF THE INVENTION

The invention retrieves e-mail via the Internet, allowing a user to input his e-mail address having a hostname and a password to a computer having a central processing unit, at least one data storage medium, an input device, and output device. The invention identifies an e-mail server based on the hostname and connects to the e-mail server.

The invention also prevents the computer from executing an executable data file stored on a removable data storage medium thereby reducing the risk that the system will become infected with a potential virus stored on the removable data storage medium.

DETAILED DESCRIPTION OF THE INVENTION

One preferred embodiment of the invention allows the user to retrieve his/her e-mail messages via the Internet using a mail server address directly, thereby eliminating the need for the user to separately log onto the electronic mail system associated with the user's e-mail account. The user can retrieve hie e-mail using an Internet Kiosk. The Kiosk houses a communication facility that connects to the Internet, a computer and a camera. The Kiosk may be established at a convenient location, such as a restaurant, airport terminal, hotel, bank, shopping center, etc. The present invention operates in one of two ways: 1) when the program tries to determine the correct mail server address and 2) when a user knows his mail server address.

Figure 1:
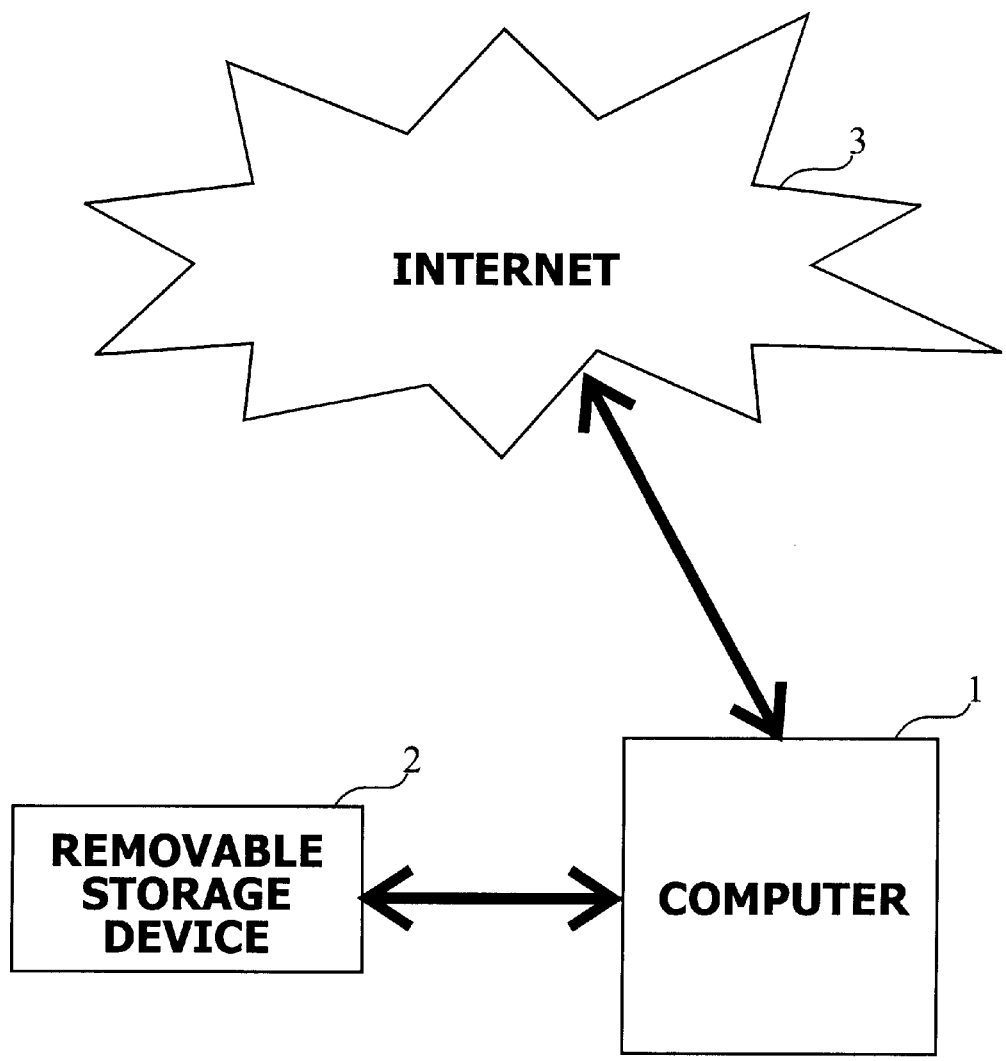
FIG. 1 illustrates one embodiment of the physical aspects of the invention.

Referring to FIG. 1, the Internet Kiosk comprising a computer, 1, having a fixed storage device and a removable storage device, 2, connected to the Internet, 3, is shown.

Figure 2:
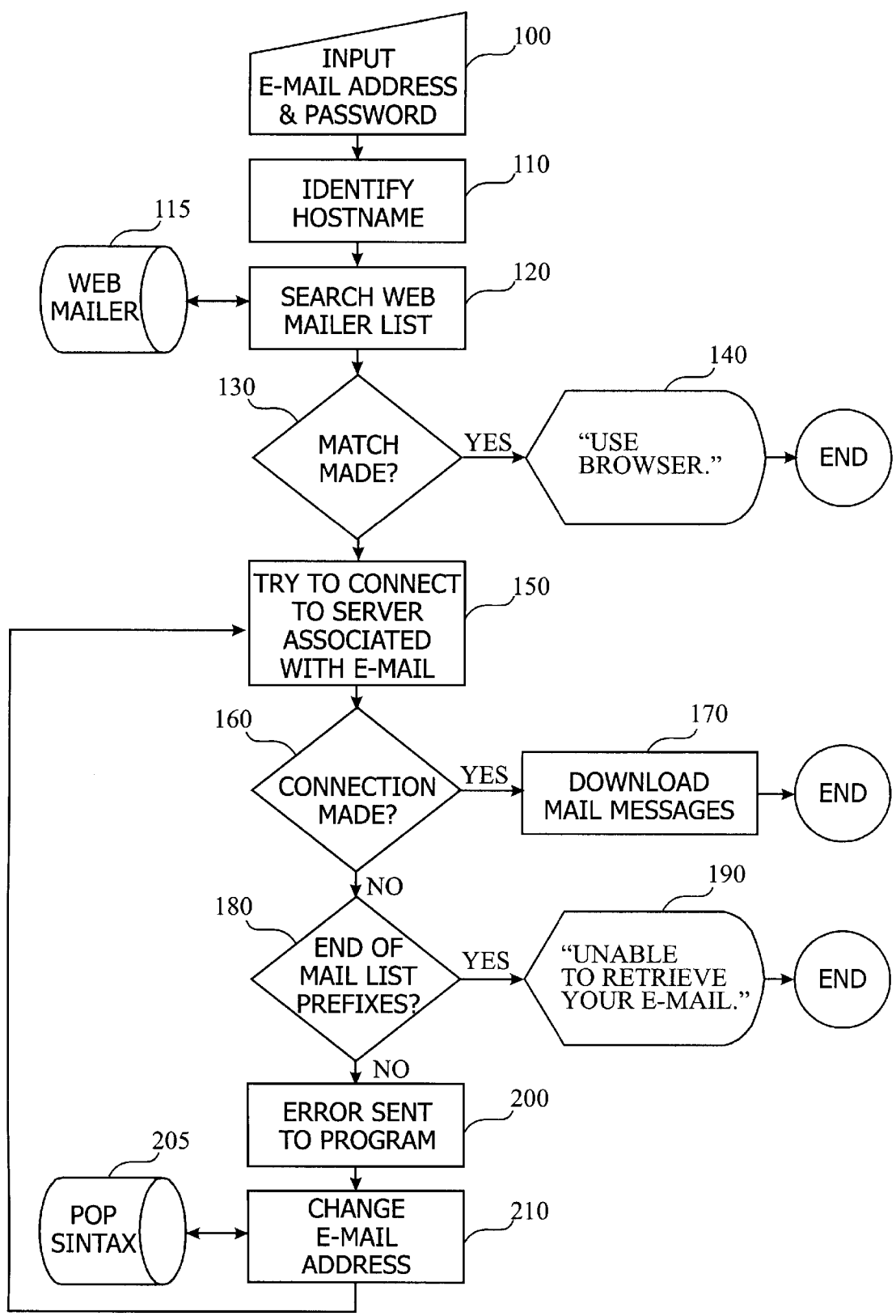
FIG. 2 is a flowchart illustrating one embodiment of a method of retrieving e-mail.

FIG. 2 illustrates a preferred embodiment of the invention in which the program tries to "guess" the correct mail server address. Sitting at the Internet Kiosk, at 100, a user enters her e-mail address and her password into the system. Generally, an e-mail address follows a standard format, namely username@hostname, whereby the "username" identifies the user, the "@" symbol separates the "username" and the "hostname", and the "hostname" identifies the host or mail server that stores the user's e-mail messages. At 110, the program separates the user's e-email address into its components, username and hostname.

At 120 & 130, the program searches a predetermined upgradeable database of "web mailers" for the hostname. A "web mailer" is a mail server that only forwards mail or is only accessed using a browser. Examples of known web mailers include "hotmail.com", "zipmail.com.br", "netmail.web.aol.com", etc. Whenever a new web mailer becomes available it is added to the database to ensure that the database remains current.

At 140, if the hostname matches a web mailer on the database, the program displays a message on the screen informing the user to use the browser to access his/her e-mail messages.

If a match is not made, at 150, the program makes an initial attempt to connect to the mail server associated with the user's hostname. The program sends the user's e-mail address and login password to an Active-X control. Next, the program calls a function in the Active-X control to connect to the server.

If a successful connection is made, at 180, the program signals the Active-X control to download all message headers from the server. After downloading the message headers, the program displays them to the user and waits for the user to click on a desired message header. When the user clicks on the desired message header, the program calls an Active-X control to download the chosen message associated with the message header. After the message has downloaded, the user has the option to view, print or save her e-mail onto a removable storage medium.

If a connection is not made on the first attempt, at 200, the Active-X control returns an error to the program. At 210, the program changes the user's original e-mail address by adding a POP syntax to the hostname. Examples of POP syntaxes include "pop", "mail", "mail-gw", "email", etc. A list of POP syntaxes is stored in another upgradeable database. For example, if the original address is username@ibm.net, the program will extract a POP syntax from the database, such as "pop5" and add the syntax to the hostname. Thus, the original e-mail address changes to username@pop5.ibm.net. The program will now try to connect to the POP server, using the changed e-mail address. If the program fails to connect, the program will try again with the next POP syntax on the list, repeating the forgoing steps until either a connection is ultimately made to a server or the POP syntax list is exhausted.

If the end of the POP syntax list is reached without a successful connection, the program displays an error message on the screen, such as "Sorry. Due to the nature of the Internet and safety measures from your ISP, we were not able to retrieve your e-mail at this time."

If a user knows his mail server address, she will enter the mail server address and password. Next, the program will connect to the server associated with the user's e-mail account. After connecting to the server, the user can view, print or save her e-mail onto a removable storage medium, such as a floppy disk.

The system provides the user with limited access to the computer's hard drive yet maintains some degree of usability for the user. The user is restricted from executing a program stored on a removable storage medium. This restriction safeguards the integrity of the system by preventing a virus, if resident on the user's medium, from invading the system.

In a preferred embodiment of the program, an interface allows the user to save a file to a removable data storage medium and attach a file stored on the removable data storage medium to an e-mail message. The removable data storage medium used in the preferred embodiment is a floppy disk but the invention is not limited thereby and any other similar device can be used. The program cannot execute files stored on the floppy because that option is not available to the user.

Figure 3:
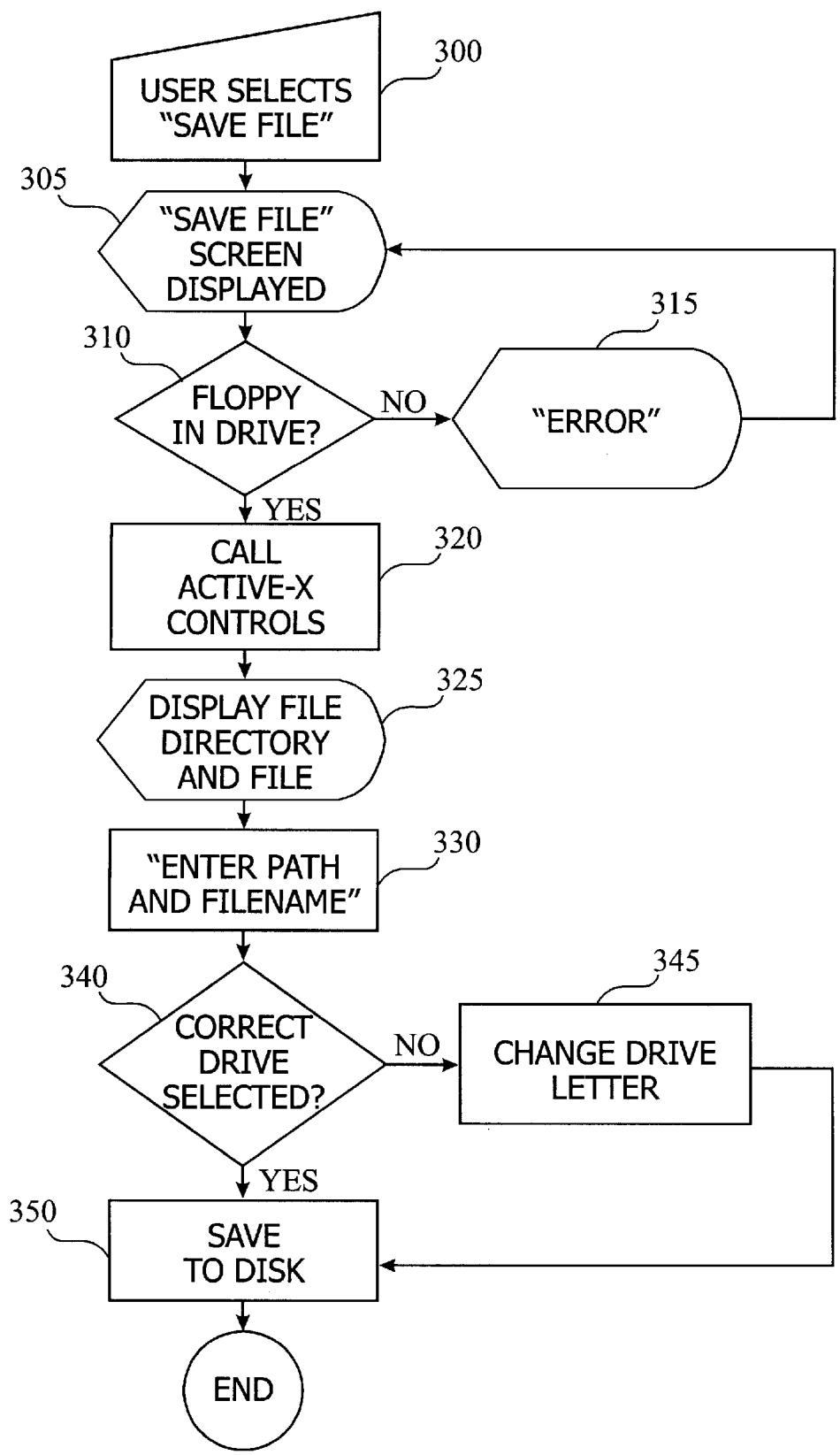
FIG. 3 illustrates one embodiment of the SAVE FILE feature of the invention.

Referring to FIG. 3, to save a file to the floppy disk, the user at 300 selects the "Save File" option displayed on the screen. At 305, the program opens and displays the "Save File" Screen. At 310, the program checks for a floppy disk in the floppy disk drive. If no disk is in the floppy drive, the program displays an error message 315, on the screen and waits for the user to insert a floppy disk into the floppy drive. If a disk is in the floppy drive, at 320, the program calls two Active-X controls that are part of a set of programming tools. One of the Active-X controls displays the floppy's file directory or folder, 325. The other Active-X control displays the files inside the directories or folders. The two Active-X controls are not used to read the files.

At 330, the user chooses the file folder in which to save the file and enters a filename and a path.

To avoid inadvertently accessing the hard drive when the user enters the path, the program, at 340 & 345, has a built in instruction that prevents the user from saving to the hard disk. For example, if the drive letter c designates the hard disk and the user enters the path, c:\directory\filename, the program will automatically change the drive letter to the letter corresponding to the floppy drive (typically the letter a). In operation, the program first detects the presence of the 11:11 and checks to see if the letter "a" precedes the colon. If another letter precedes the colon, the program changes the letter to the letter a.

Figure 4:
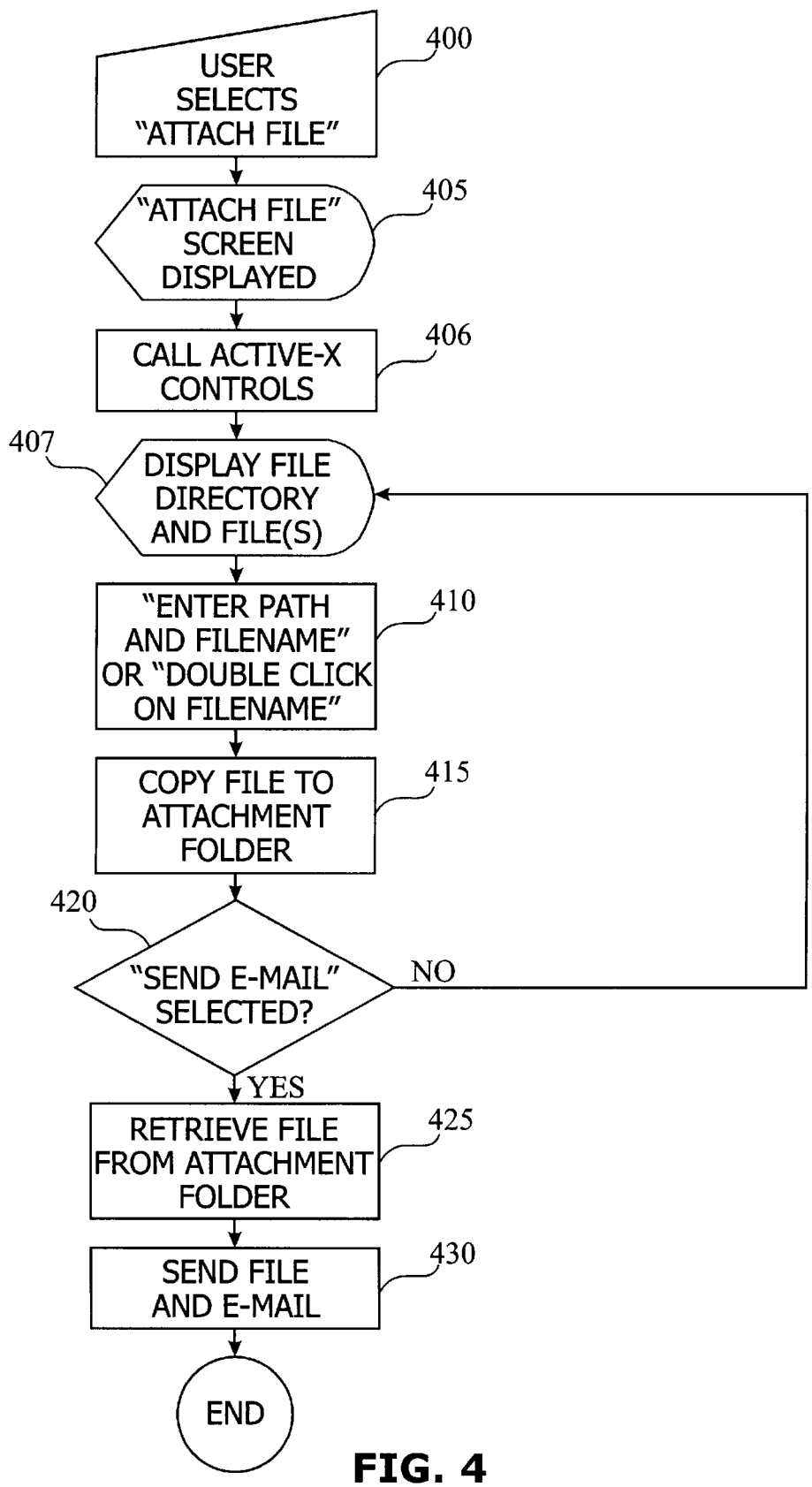
FIG. 4 illustrates one embodiment of the ATTACH FILE feature of the invention.

Referring to FIG. 4, when attaching a file from the floppy disk to an e-mail message, the user, at 400, selects the "Attach File" option, and at 405, the program opens and displays an "Attach File" screen. At 406 & 407, the program calls two Active-X controls that are part of a set of programming tools. One of the Active-X controls displays the floppy's file directory or folder. The other Active-X control displays the files inside the directories or folders. The user can then attach the file to an e-mail message by either double-clicking on the file or entering the path and filename, 410. Again, the program does not allow the user to execute the file.

At 415, the program merely makes a copy of the file from the floppy disk and places the copy of the file to an attachment folder. When the user is ready to send the e-mail, the program, at 425, retrieves the copy of the program from the attachment folder and at 430, sends the file along with the e-mail to an intended recipient.

At any time the user can cancel the "Save File" or the "Attach File" operation by selecting the "Cancel" feature.

Having now described a preferred embodiment of the invention, it should be apparent to those skilled in the art that the foregoing is illustrative only and not limiting, having been presented by way of example only. Numerous other embodiments of the modification thereof are contemplated as falling within the scope of the present invention as defined by the appended claims and equivalents thereto.

What is claimed is:

1. A method of processing an e-mail address to access, via a communications medium, e-mail resident on an e-mail server, said method comprising the steps of:
   (a) maintaining a list of one or more e-mail syntaxes;
   (b) acquiring a first e-mail address;
   (c) determining whether said first e-mail address is a web mailer address;
   (d) if said first e-mail address is a web mailer address then generating an automated message else
      (i) accessing, via said communications medium, a first e-mail server associated with said first e-mail address to further access e-mail associated with said first e-mail server;
      (ii) if access to said first e-mail server fails then iteratively repeating steps (1) to (3) below until access to a second e-mail server is established or each syntax in said list of e-mail syntaxes has been selected;
         (1) selecting a syntax from said list of one or more e-mail syntaxes;
         (2) modifying said first e-mail address using said selected syntax to create a second address; and
         (3) accessing, via said communications medium, a second e-mail server associated with said second address to further access e-mail associated with said second e-mail server.

2. A method as in claim 1 wherein said communications medium is the Internet.

3. An apparatus for processing an e-mail address to access, via a communications medium, e-mail resident on an e-mail server, said apparatus comprising:
   (a) an interface for communicating over said communications medium; and
   (b) a processor configured to
      (i) acquire a first e-mail address;
      (ii) maintain a list of one or more e-mail syntaxes;
      (iii) determine whether said first e-mail address is a web mailer address;
      (iv) if said first e-mail address is a web mailer address then generate an automated message else
      (v) access, via said communications medium, a first e-mail server associated with said first e-mail address to further access e-mail associated with said first e-mail server,
      (vi) if access to said first e-mail server fails then iteratively repeating steps (1) to (3) below until access to a second e-mail server is established or each syntax in said list of e-mail syntaxes has been selected;
         (1) select a syntax from said list of one or more e-nail syntaxes;
         (2) modify said first e-mail address using said selected syntax to create a second address; and
         (3) access, via said communications medium, a second e-mail server associated with said second address to further access e-mail associated with said second e-mail server.

4. An apparatus as in claim 3 wherein said communications medium is the Internet.

5. A computer readable medium having computer-executable instructions for performing a method of processing an e-mail address to access, via a communications medium, e-mail resident on an e-mail server, said method comprising the steps of;
   (a) maintaining a list of one or more e-mail syntaxes;
   (b) acquiring a first e-mail address;
   (c) determining whether said first e-mail address is a web mailer address;
   (d) if said first e-mail address is a web mailer address then generating an automated message else (i) accessing, via said communications medium, a first e-mail server associated with said first e-mail address to access e-mail associated with said first e-mail server;
(ii) if access to said first e-mail server fails then iteratively repeating steps (1) to (3) below until access to a second e-mail server is established or each syntax in said list of e-mail syntaxes has been selected;
  (1) selecting a syntax from said list of one or more e-mail syntaxes;
  (2) modifying said first e-mail address using said selected syntax to create a second address; and
  (3) accessing, via said communications medium, a second e-mail server associated with said second address to access e-mail associated with said second e-mail server.

6. A computer-readable medium as in claim 5 wherein said communications medium is the Internet.

* * * * *